United States Patent [19]

Kant

[11] 4,198,572

[45] Apr. 15, 1980

[54] REGULATED APPARATUS FOR THE GENERATION OF ELECTRICAL ENERGY, SUCH AS A WIND GENERATOR

[75] Inventor: Michel Kant, Paris, France

[73] Assignee: Agence Nationale de Valorisation de la Recherche (ANVAR), Neuilly-sur-Seine, France

[21] Appl. No.: 806,472

[22] Filed: Jun. 14, 1977

[30] Foreign Application Priority Data

Jun. 18, 1976 [FR] France .................. 76 18549

[51] Int. Cl.² ............................................. H02P 9/04
[52] U.S. Cl. ...................................... 290/44; 290/55; 322/35
[58] Field of Search .............. 290/44, 55; 310/93, 310/95, 210; 188/180; 192/84 R; 322/28, 35, 100, 14, 15, 32, 54, 55

[56] References Cited

U.S. PATENT DOCUMENTS

| 499,544 | 6/1893 | Henry | 310/93 X |
|---|---|---|---|
| 1,894,357 | 1/1933 | Manikowske et al. | 310/93 X |
| 2,159,886 | 5/1939 | Cullin | 290/44 |
| 2,767,367 | 10/1956 | Black | 322/32 |

FOREIGN PATENT DOCUMENTS

2266006 10/1975 France ........................... 290/44

*Primary Examiner*—Gene Z. Rubinson
*Assistant Examiner*—John W. Redman
*Attorney, Agent, or Firm*—Cushman, Darby & Cushman

[57] ABSTRACT

The invention relates to a regulated apparatus for the generation of electrical energy.

A wind generator comprises a propeller having fixed blades and a generator connected by a transmission to the propeller and having sets of main and secondary brushes. The hub of the propeller comprises a rotor of an eddy-current brake whose inductor stator is supplied by a current delivered, starting from a certain speed, by the secondary brushes of the generator which are angularly shifted relative to their neutral position.

7 Claims, 8 Drawing Figures

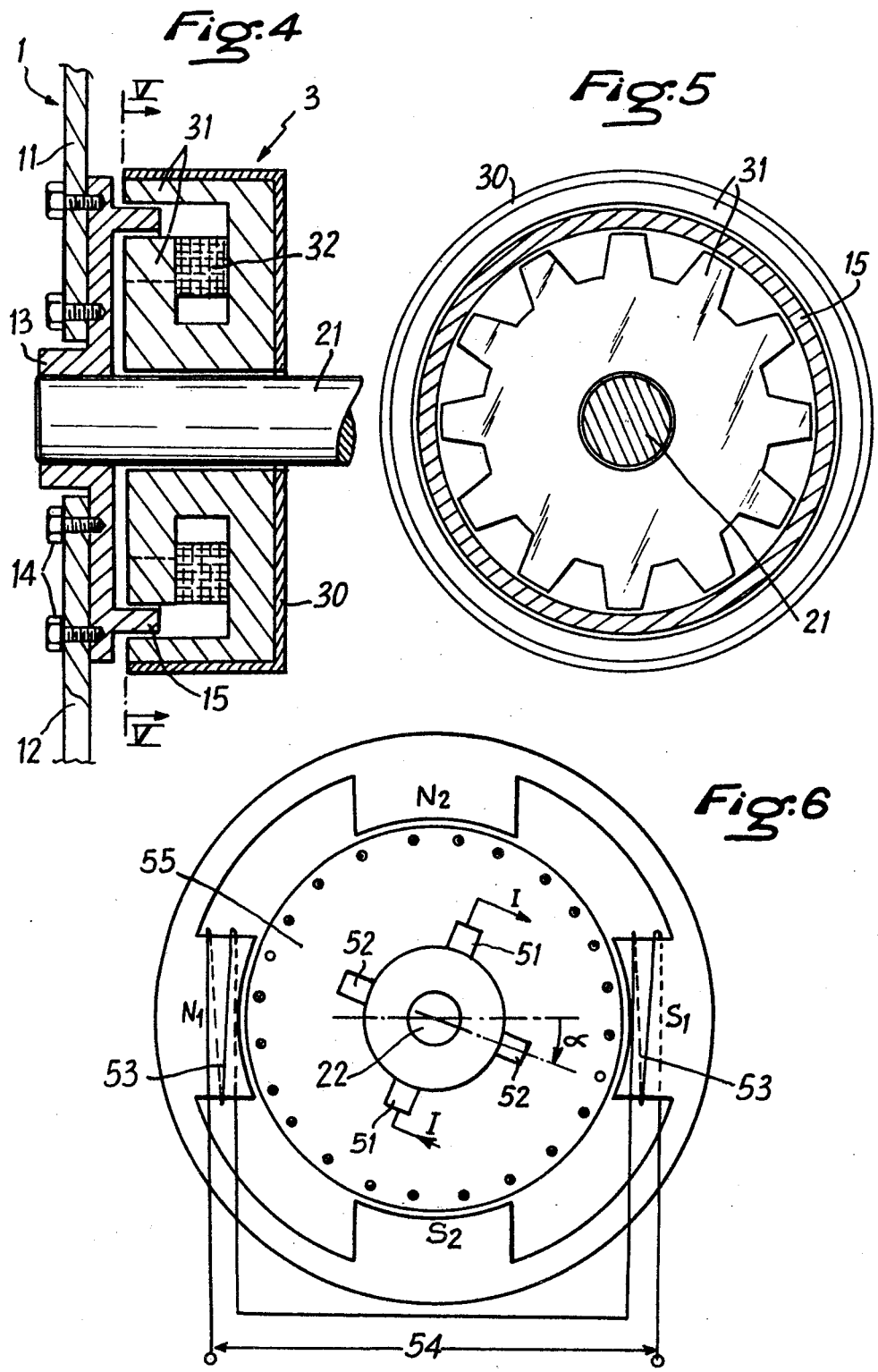

REGULATED APPARATUS FOR THE GENERATION OF ELECTRICAL ENERGY, SUCH AS A WIND GENERATOR

BACKGROUND OF THE INVENTION

The present invention relates to a regulated apparatus for the generation of electrical energy, such as a wind generator, comprising driving means consisting of a propeller and a transmission mechanism on whose input shaft the propeller is mounted and whose output shaft is a driving drive shaft, a generator driven by the driving shaft, and means for regulating the speed of rotation of the propeller.

In apparatus of this kind it is necessary both to effect mechanical regulation for limiting the maximum speed and possibly to regulate the driving speed, and to regulate the voltage by acting on the excitation of the generator. It is known to regulate the driving speed by adjustment of variable pitch blades of the propeller, and to regulate the voltage by electronic regulation of the excitation of the generator.

These known procedures have numerous disadvantages. Adjustment of the propeller blades is usually effected by means of an inertia relay, which is liable to failure and is difficult to maintain. Furthermore, an inertia relay is a source of vibrations, and such vibrations destroy the bearings of the windmill. Electronic regulators also require specialized maintenance, so that when a failure occurs there is an unacceptable delay because of the usually isolated situation of the apparatus. Additionally such electronic regulators are very expensive to buy, and not infrequently cost as much as all the rest of the windmill.

A main object of the invention is to eliminate all regulating relays and to provide a simple structure which is easy to maintain. A further object of the invention it to use simple regulation means which makes it possible to select and regulate minimum and maximum speeds, based on a chosen nominal speed.

Yet another object of the invention is to make it possible to drive the aerogenerator at an initial speed as soon as a minimum wind speed occurs after a calm period, which minimum wind speed is lower than the wind speed for starting the propeller, but is sufficient to produce energy at that minimum wind speed.

SUMMARY

According to the invention there is provided a regulated apparatus for generating electrical energy, such as a wind-driven apparatus, comprising a propeller, a generator having a drive shaft and transmission means including an input shaft on which the propeller is mounted and an eddy-current brake mounted on one of said shafts for regulating the speed of the propeller.

In this way the input power of the aerogenerator is regulated without mechanical relays whose presence would not be conducive to maintaining the installation in good condition. Furthermore, there is no loss when the eddy-current brake is not excited. The life of this apparatus is indefinite and its braking torque increases rapidly with speed, so that operation with maximum wind is still very stable.

In one embodiment of the invention the eddy-current brake is mounted on the propeller shaft and its rotor is formed by the hub of the propeller itself.

In this way the blades of the propeller serve as a radiator for cooling the eddy-current brake. The stronger the wind, the greater the cooling, which is advantageous because with a strong wind a considerable amount of heat has to be dissipated from the brake.

Preferably the propeller is of the fixed blade type. This was previously uneconomical. It is therefore remarkable that the invention makes it possible to use with advantage a fixed-blade propeller which is substantially unaffected by mechanical disturbances.

The propeller is advantageously of the two-blade type, which has the highest aerodynamic efficiency.

In a preferred embodiment of the invention the aerogenerator is an electric generator having two sets of brushes, main brushes and secondary brushes.

The set of secondary brushes is angularly shifted relative to its neutral position, and the voltage at these secondary brushes is used to feed the supply terminals of the inductor of the eddy-current brake. There is thus provided a self-regulating unit simultaneously regulating and automatically optimizing the input power and output current. Furthermore, rectification and regulation of the curent are not required if the aerogenerator supplies a floating storage battery.

It is advantageous for the angular shifting of the secondary brushes to be adjustable, so that the intensity of the current supplied to the inductor of the eddy-current brake constitutes the adjustable parameter for the adjustment of the rotational speed of the propeller.

Also the rotors of the brake and of the generator may be mounted on the same shaft, which shaft is either the hub shaft of the propeller for low power windmill in which the rotational speed is relatively high, or the output shaft a step-up gear train for windmills of higher power in which the rotational speed is lower. In the latter case the eddy-current brake may be mounted on the drive shaft of the generator.

The invention makes it possible to design a wind-generator in which the driving and generating part is very compact and in the form of a unitary pivoting moving body.

The apparatus may include an anemometric pick-up sensitive to at least one threshold selected as minimum operating wind speed, and the signal supplied by this pickup is used to start up the aerogenerator, with the aid of an auxiliary source, so that the generator acts as initial drive motor for the propeller and starts the propeller, which then drives the generator.

In this manner generation of energy can be achieved as soon as there is a wind which may be weaker than the starting wind, provided that this wind is sufficient to drive the aerogenerator once the propeller has been started.

The auxiliary source may be the battery which the aerogenerator normally charges.

BRIEF DESCRIPTION OF THE DRAWINGS

Some embodiments of the invention will now be described, by way of example, with reference to the accompanying drawings, in which:

FIG. 4 is an axial sectional view of an assembly consisting of a propeller and an eddy-current brake forming part of the wind generator of any one of FIGS. 1 to 3;

FIG. 5 is a view partly in cross-section, of the eddy-current brake on the line V—V of FIG. 4;

FIG. 6 is a view, at right angles to its axis, of the generator of FIGS. 1 to 3;

DESCRIPTION OF THE PREFERRED EMBODIMENTS

The description given below will be more readily understood by referring to the French standard NF E 50001 according to which:

(a) the nominal wind speed is that at which the aerogenerator supplies its nominal power at nominal voltage and nominal rotational speed; the usual values are 6 to 7.5, and 9.5 m/s. The nominal power of the generator is taken as that of the aerogenerator:

(b) the maximum wind speed above which the generator begins to supply energy must be at most equal to half its nominal value. This is the minimum operating value:

(c) when the wind speed is higher than the nominal value and less than twice that value the power developed by the aerogenerator must be between ¾ and 4/3 of its nominal value; above this range it is no longer guaranteed. The maximum speed for guaranteed operation is thus defined.

The fundamental criterion for the selection of nominal wind speed is the energy recovered over a year.

As an example, there are given below the values of wind speed corresponding to a mean annual value of 5 m/s.

Mean annual speed: 5 m/s.
Nominal speed: 7.5 m/s.
Minimum operating speed: 3.75 m/s.
Maximum speed for guaranteed operation: 15 m/s.

Figure 1:
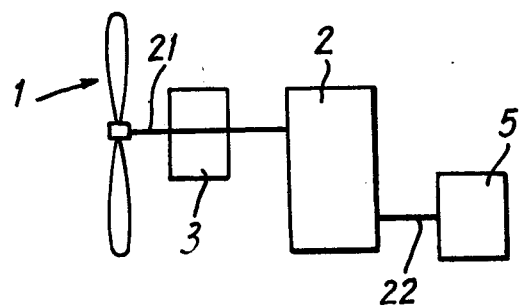
FIG. 1 illustrates diagrammatically one embodiment of the invention including a propeller and an aerogenerator.
Figure 2:
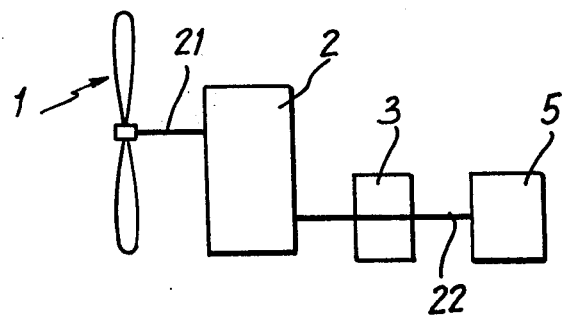
FIG. 2 illustrates diagrammatically a second embodiment of the invention.

The installations illustrated diagramatically in FIGS. 1 and 2 each comprise a propeller 1 mounted on an input shaft 21 of a step-up transmission 2, whose output shaft 22 drives an aerogenerator 5.

Figure 3:
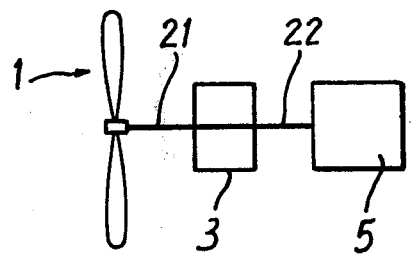
FIG. 3 illustrates diagrammatically a third embodiment of the invention.

In FIG. 3 the propeller 1 is mounted directly on the drive shaft 22 of an aerogenerator 5, that is the shafts 21 and 22 are aligned for direct transmission. As described below, an eddy-current brake 3 is mounted on the shaft 21 in FIGS. 1 and 3.

A similar eddy-current brake is mounted on a shaft common to the rotors of the brake and generator in FIG. 2.

In FIGS. 4 and 5 there is shown, as in FIGS. 1 and 3, the mounting of the propeller 1 on the shaft 21, on which the eddy-current brake is also mounted. On the end of the shaft 21 is fastened a hub plate 13 which carries blades 11 and 12 of the propeller 1. The plate 13 also carries a cylindrical sleeve 15 which is the rotor of the eddy-current brake 3. The blades 11 and 12 are fastened to one side of the plate 1 by known fixing means, such as screws 14 or other fastening means. The rotor sleeve 15 extends from the opposite side of the plate 13. The brake shown in FIGS. 3 and 4 is a homopolar brake; but a heteropolar brake would serve exactly the same purpose. In any case the eddy-current brake is of conventional kind and has no special features. The rotor is mounted on the shaft 21 in FIGS. 1 and 3 and on the shaft 22 in FIG. 2. The stator of the eddy-current brake is an annular magnetic inductor 31 in whose air gap the rotor sleeve 15 rotates, and whose magnetic field is produced by a coil 32 to which current is supplied as described below. The stator 31 is contained in a casing 30.

The aerogenerator 5 is illustrated in FIG. 6 and is a Rosenberg type transverse field dynamo, also known as the induction reaction type or dynamo having two sets of brushes, a main set 51 and a secondary set 52. The stator of this dynamo has four poles $N_1S_1$, $N_2S_2$ in quadrature. The two poles $N_1S_1$ carry inductor windings 53 supplied by an excitation circuit 54, and the other two poles $N_2S_2$ do not have windings. As will be explained, an output is taken from the brushes 51, and is used in practice for charging a floating storage battery. As will also be explained below, the two secondary brushes 52 are used for supplying the inductor 31 of the eddy-current brake 3. At least the secondary brushes 52 are fixed in a shifted position relative to the poles by an angle $\alpha$ which is adjustable by manual or mechanical means known per se.

Regulation of the inductor current makes possible adjustment of the current of armature 55 of the dynamo to its nominal value. Adjustment of the brushes to a suitable angle $\alpha$ is controlled to respect the no-load speed and rated speed which are imposed by the propeller. Furthermore, the short-circuit current $I_q$ of the brushes 52 will change direction at a rotation speed which will be selected as the nominal speed. The connection of a diode 58, see FIG. 7, in series with the secondary brushes 52 makes it possible to block the current $I_q$ during starting, and thus to eliminate the torque due to this current and to eliminate no-load losses. Another advantage of the shifting of the brushes, is that the generator 5 will function as a shunt motor between zero and noload speeds, and then as a shunt generator between noload and nominal speeds. Above nominal speed the generator will be self-regulating and it will be possible for the inductor winding of the eddy-current brake 3 to be fed by the secondary brushes either directly or with amplification, as will now be explained in greater detail with reference to FIG. 6 and FIG. 7.

Figure 7:
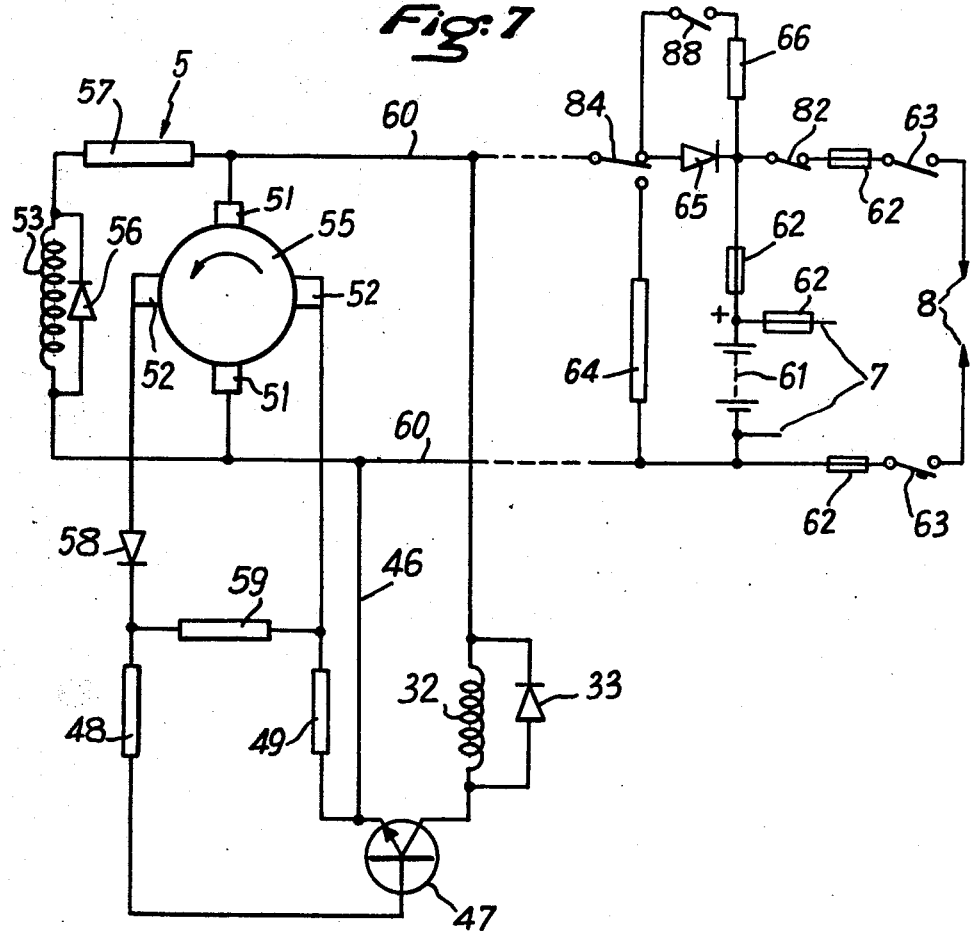
FIG. 7 is a circuit diagram of a regulator circuit for regulating the generator.
Figure 8:
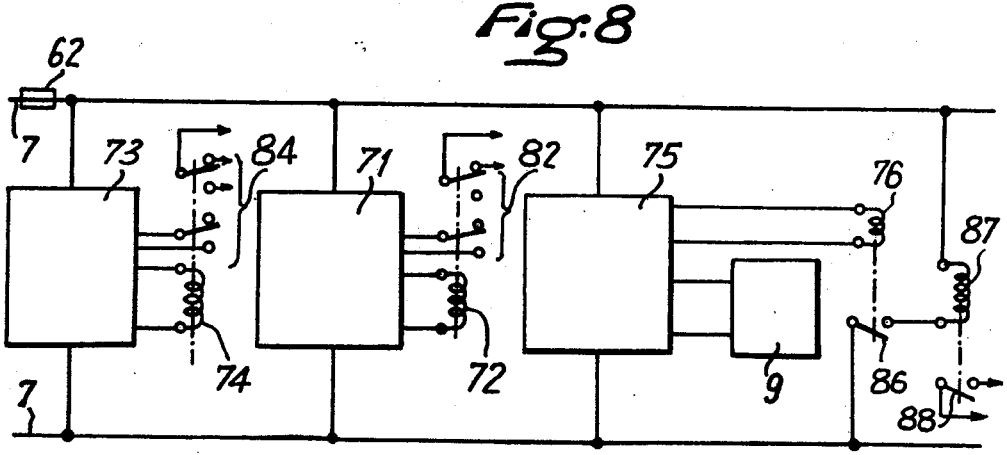
FIG. 8 illustrates a circuit for regulating the charging of a battery supplied by the apparatus and for the starting of the propeller at a low wind speed.

An installation according to the invention is designed to supply a floating battery 61 and comprises a circuit 7 which regulates the end of charge and the end of discharge of the battery. The battery 61 is connected to a load circuit 8 through fuses 62 and control contacts 63. Charging current is supplied to the battery 61 from the brushes 51 of the aerogenerator by a circuit 60. A circuit 71, FIG. 8, which detects insufficient charging of the battery 61 operates a relay 72 which opens contacts 82 which are connected in series with the load. Another detection circuit 73 operates a relay 74 which opens contacts 84, which, as shown in FIG. 7 connect a ballast resistor 64 across the brushes 51 when the battery 61 is fully charged. This resistor 64 has a high value so as to generate a sufficient voltage to provide the nominal current which is then used for operating the eddy-current brake. Finally, as soon as minimum wind speed occurs, a circuit 75, FIG. 8 which is responsive to a signal received from an auxiliary anemometer 9, operates a relay 76 whose contacts 86 close to energise for a limited time a relay 87 whose contacts 86 are closed to switch a starting resistor 66 across a blocking diode 65, as shown in FIG. 7, so that the generator 5 acts as a motor when it starts.

The circuit of FIG. 7 also includes the excitation windings 53 of the generator 5, which are shunted by a diode 56. The excitation current is regulated by a resistor 57.

The circuit of FIG. 7 also includes a supply circuit for the coil 32 of the inductor 31 of the eddy-current brake 3. The diode 58 is connected in series with a resistor 59 across the brushes 52, and the resistor 59 shunts the brushes 52 when the direction of the current collected by these brushes corresponds to a value lower than nominal speed. When the direction of the current collected by the brushes 52 corresponds to a value higher than nominal speed, this current is applied to the base of a transistor 47 which is connected in series with resistors 48 and 49 across the resistor 59. The transistor 47 is connected as an amplifier and provides a regulated supply to the inductor coil 32 by means of a connection 46 carrying the excitation current from the circuit 60. The inductor coil 32 is thus fed with a current proportional to that which is collected by the brushes 52 of the generator.

A shunt diode 33 protects the inductor coil 32 against the supply of current in a direction corresponding to a speed of the generator 5 lower than nominal speed.

If suitable values are chosen for the components used the inductor coil 32 can be supplied directly, in a strictly equivalent manner, with the current collected by the brushes 52 of the generator.

What I claim is:

1. A regulated wind-driven electrical energy device, comprising:
    a driving machinery including transmission means having an input shaft and an output shaft, said output shaft being a drive shaft, said driving machinery further including a hub mounted on said input shaft and a fixed blade propeller joined to said hub;
    an induction reaction dynamo operatively connected to the drive shaft to be driven thereby, said dynamo having a group of main brushes for delivering a current at a normal output voltage and a group of secondary brushes, shifted to a fixed position angularly related to a neutral brush position, for delivering a current which is dependent on the speed of said dynamo;
    means for regulating the speed of the propeller and the output voltage of the dynamo, said regulating means including an eddy-current brake having at least one induction coil, said hub serving as a rotor of the eddy-current brake; and
    means connecting the secondary brushes of the dynamo to said induction coil of the eddy-current brake, said connecting means being operative only above a fixed speed of the dynamo greater than the minimum operating speed whereby the current delivered by the secondary brushes is supplied to the induction coil.

2. A wind-driven device according to claim 1, wherein the current collected on the secondary brushes is used through an amplifier for feeding the coil(s) of the eddy-current brake.

3. A wind-driven device according to claim 1, wherein the fixed position of the angular shifting of the secondary brushes is adjustable.

4. A wind-driven device according to claim 2, wherein the rotor of the eddy-current brake is mounted on the output shaft.

5. A wind-driven device according to claim 3, wherein the connection means between secondary brushes of the dynamo and coil(s) of the eddy-current brake includes directionnal means for the circulating current.

6. A regulated wind-driven electrical energy device comprising:
    a driving machinery including transmission means having an input shaft and an output shaft, said output shaft being a drive shaft, said driving machinery further including a hub mounted on said input shaft and a fixed blade propeller joined to said hub;
    an electric generator operatively connected to the drive shaft to be driven thereby so as to deliver a current at a nominal output voltage;
    means for regulating the speed of the propeller and the output voltage of the electrical generator, said regulating means including an eddy-current brake having at least one induction coil, said hub serving as a rotor of the eddy-current brake; and
    means connecting the electric generator to the induction coil(s) of the eddy-current brake, said connecting means being operative only above a fixed speed of the generator greater than the minimum operating speed to deliver to the induction coil(s) a current being a dependent variable of the speed of said generator.

7. A regulated wind-driven electrical energy device, comprising:
    a driving machinery including transmission means having an input shaft and an output shaft, said output shaft being a drive shaft, said driving machinery further including a hub mounted on said input shaft and a fixed blade propeller joined to said hub;
    an induction reaction dynamo operatively connected to the drive shaft to be driven thereby so as to deliver a current at a nominal output voltage;
    means for regulating the speed of the propeller and the output voltage of the dynamo, said regulating means including an eddy-current brake having at least one induction coil, said hub serving as a rotor of the eddy-current brake; and
    means connecting the dynamo to the induction coil(s) of the eddy-current brake, said connecting means being operative only above a fixed speed of the dynamo greater than the minimum operating speed to deliver to the induction coil(s) a current being a dependent variable of the speed of said dynamo.

* * * * *